Oct. 5, 1965   F. O. BRANDT   3,209,492
APPARATUS FOR TESTING THE GERMINATION OF SEEDS
Filed Aug. 5, 1963   4 Sheets-Sheet 1
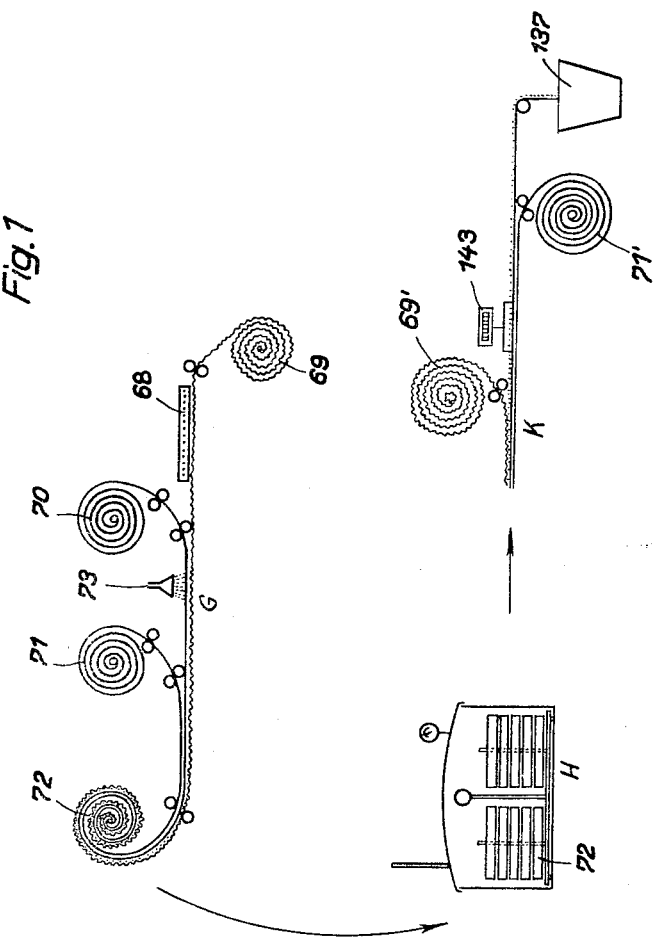

Oct. 5, 1965  F. O. BRANDT  3,209,492
APPARATUS FOR TESTING THE GERMINATION OF SEEDS
Filed Aug. 5, 1963  4 Sheets-Sheet 2
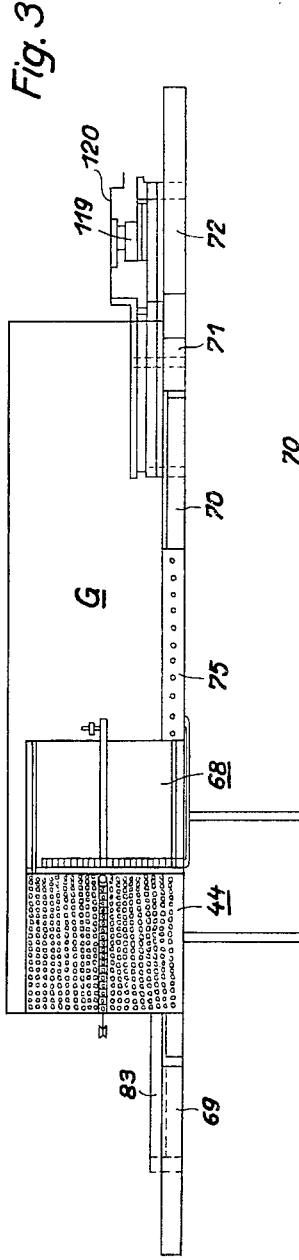
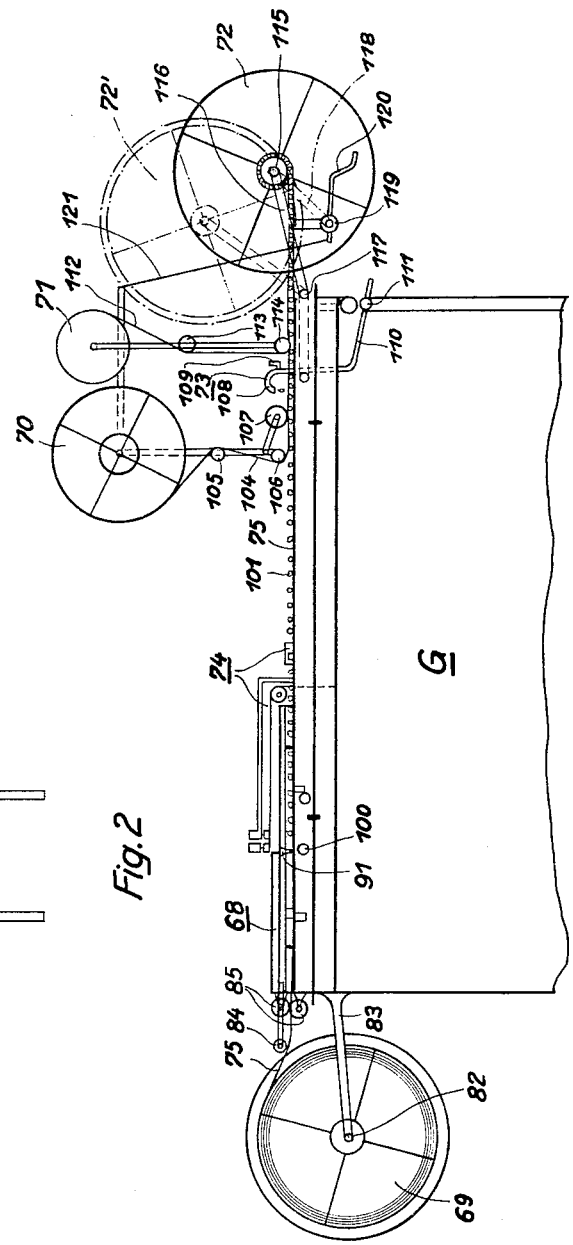

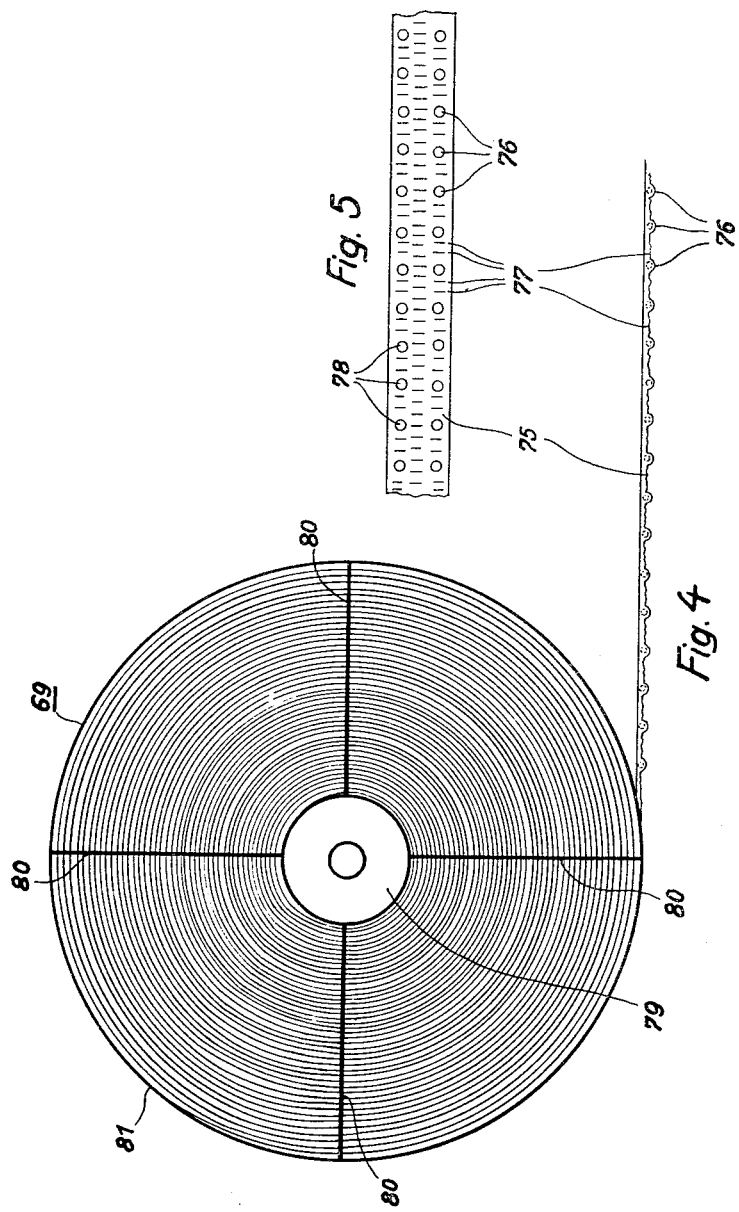

Oct. 5, 1965  F. O. BRANDT  3,209,492
APPARATUS FOR TESTING THE GERMINATION OF SEEDS
Filed Aug. 5, 1963  4 Sheets-Sheet 4
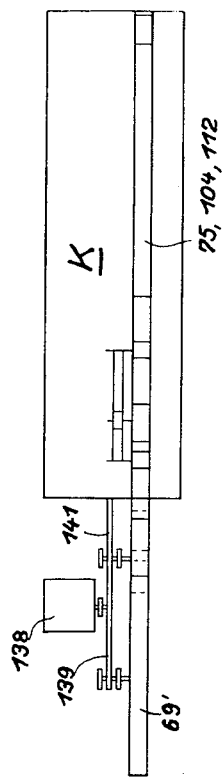
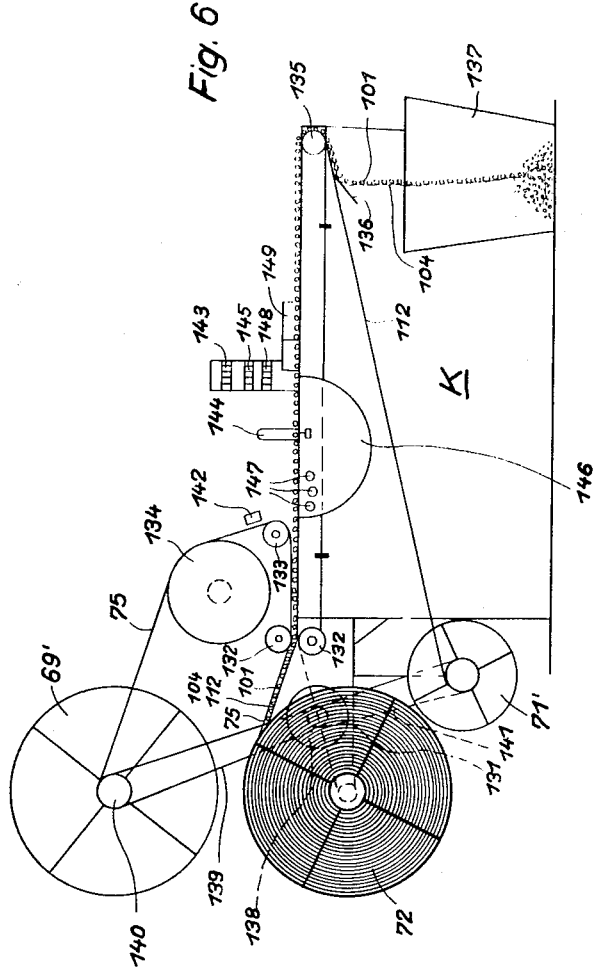

United States Patent Office 3,209,492
Patented Oct. 5, 1965

3,209,492
APPARATUS FOR TESTING THE GERMINATION
OF SEEDS
Fritz Otto Brandt, Dorchenstrasse 26, Einbeck, Germany
Filed Aug. 5, 1963, Ser. No. 299,886
Claims priority, application Germany, Aug. 16, 1962,
B 68,442
7 Claims. (Cl. 47—16)

In connection with the testing of beet seeds, germination tests have hitherto been carried out either by the so-called sand germination bed method or by the so-called filter paper method.

In the sand germination bed method, a large number of seeds counted out by hand are deposited, also by hand, in a corresponding large number of germination holes, which have been produced likewise manually in sterile sand, which in its turn has been placed beforehand, again manually, in germination trays. Moreover, in the filter paper method, seeds counted out by hand are placed, again manually, in pockets of filter paper. In both methods, the germination media are moistened with water by hand. After germination has occurred, it is necessary with both methods for the seedlings to be extracted by hand from the sand or the filter paper pockets, laid out in heaps of ten and again counted by hand. With the filter paper method, the counting out must even be carried out for several days in succession, it being necessary to remove the large shoots, since otherwise it is not possible to establish to which seeds the individual shoots belong.

It is clear that when carrying out the germination tests by manual labor according to the two prior known methods, an enormous expense for labor is necessary, when it is taken into account that, for example, when using the sand germination bed method about ninety thousand test trays must each be seeded with a hundred seeds and counted out in a germination test period lasting about seven months, the average hourly capacity of each worker being about three test trays. On account of this great expenditure on human labor and of the very large number of tests which take place during the comparatively short campaign, the germination tests can only be conducted with the smallest possible number of repetitions. Especially in the months before sowing, the carrying out of the germination tests at the correct time is often only possible with great difficulties.

The heavy cost of manual labour with the hitherto usual germination tests has other disadvantages also. For example, the wetting of the individual seed samples, carried out manually, represents a considerable source of error, since the seedlings already are in their reactions very sensitive to small variations in the supply of water. In addition, it is not possible to avoid counting errors during the numerous counting operations which are required.

One object of the invention is to provide a process and an apparatus for carrying out germination tests, whereby the disadvantages and errors just referred to are largely avoided and whereby it is nevertheless ensured that each separate specimen can be separately detected in each processing step and consequently can if necessary be individually influenced.

The invention is primarily intended to be used in connection with germination tests of beet seeds, but by appropriate modification and adaptation, it can of course also be used for germination tests with other types of seeds.

The testing method according to the invention is characterized in that the seed material to be tested is placed as individual seeds on moving seed receiving bands, which are wound on spools together with moisture-holding bands which optionally are impregnated with agents which promote germination and/or protect the seeds, which spools are thereafter exposed to the action of an accurately controlled air-conditioning system for the period necessary for the germination of the seed material and are then unwound again, the unwinding seed band being conducted past an automatic counting device for counting the seedlings.

The depositing of the seeds as individual grains on the seed band is preferably effected by introducing the seed material as separate seeds into magazines provided with corresponding chambers for individual seeds, the magazines then being guided backwards and forwards, preferably in a zig-zag manner, over a depositing funnel, which guides the separate seed grains into depressions or recesses in the seed band being conducted therebeneath. Moreover, a covering band is preferably also wound on the spool between the face of the seed band facing away from the seeds and the face of the moisture-storing band which faces away from the seeds. The reeling of the seed band should be effected at a constant speed and with a constant tension.

In counting the seedlings, the counting arrangement determines the number of the germinated seed grains and, in the case of beet seeds, the total number of seedlings and the number of seeds producing several shoots are in addition separately counted.

The invention also includes the use of the process just set forth in connection with light germination tests on beet seeds or in the growing of plants by hydroculture, peat culture or soil culture.

Another aspect of the invention is testing apparatus for carrying out the process according to the invention as just set forth, the apparatus being characterized by a setting table with automatic depositing device and seed spool reeling device, a germination chamber with spool-holding means, and a seed-counting table with a counter mechanism and a seed band winding device.

The process according to the invention will now be described by way of example with particular reference to its application to germination tests on sugar beet seeds, reference being made to the accompanying drawings, wherein:

FIGURE 1 is a diagram illustrating the process according to the invention, the principal devices G, H and K of the testing arrangement according to the invention being indicated diagrammatically, FIGURE 2 is a diagrammatic side elevation of the setting table G with an automatic depositing device and seed spool reeling device, FIGURE 3 is a diagrammatic plan view of the table G which is shown in FIGURE 2, FIGURE 4 is a diagrammatic side elevation of a seed spool and a seed band according to the invention wound thereon, FIGURE 5 is a diagrammatic plan view of the seed band shown in FIGURE 4, FIGURE 6 is a diagrammatic side elevation of the seed-counting table K with the counter mechanism and seed band reeling device, and FIGURE 7 is a diagrammatic plan view of the seed-counting table shown in FIGURE 6.

FIGURE 1 shows diagrammatically the course of the process, according to which, on a setting table G, the seed material to be tested is placed as individual seeds on a seed band, which is then reeled to form a spool together with an interwound moist band and cover band. The actual germination process takes place in the germination chamber H, whereafter the actual testing is carried out on a seed-counting table K.

The introduction of the freshly coiled seed band spools into the germination chamber H and the further transport of the seeded spools from this germination chamber to the seed-counting table K can advantageously be effected by conveyor means which are known per se, for example belt conveyor installations, but may also be carried out by hand. Since automatic conveyor means have long been known and do not as such form any part of the present invention, detailed explanation thereof is not included in the following description and these conveyor means are merely indicated by arrows in FIGURE 1.

In connection with the setting table G, FIGURE 1 of the drawings shows the most important details thereof, namely a seed band spool 69, a depositing device 68, a moist band spool 70, a moistening device 73, a cover band spool 71 and a reeled seed spool 72. The setting table G also carries a synchronizing device (indicated generally at 74 in FIGURES 2 and 3) for mutually matching the movements of the depositing device 68 and the movements of the seed, moist and cover bands.

The fully reeled seed spools are kept in a germination chamber H on vertical holding spindles of a holding frame.

In the diagrammatic view shown in FIGURE 1, again only the most important parts of the seed-counting device K are shown, namely a seed band take-up spool 69′, a cover band take-up spool 71′, a counter mechanism 143 and a waste bucket 137.

Before discussing the depositing device 68 in detail, there will first be described, by reference to FIGURES 4 and 5 of the drawings, the seed band 75 which is used according to the invention and which is unwound from the spool 69. According to the invention, the seed band advantageously consists of a resistant plastic, for example polyethylene, provided with tray- or dish-like indentations or recesses 76, which are arranged at equal distances along the length of band and each of which serves to accommodate a single seed. The diameter of these indentations or recesses is consequently preferably so chosen that the seeds to be tested can easily be positioned in the recesses. The depth of the recesses is approximately a third or a half of the recess diameter. The seed band 75 is also provided with transverse corrugations 77, which ensure sufficient passage of air through the reeled seed band in an axial direction. It can be seen from FIGURE 5 of the drawings that the seed band 75 comprises, in addition to the recesses 76, another row of such recesses 78. These last-mentioned recesses 78 do not accommodate seeds, but serve merely for guiding the band in a straight and parallel path during the winding operation and while travelling over the setting table G, as well as for optical switching operations in the actuation of light barriers which are later to be described.

The length of the seed band 75 is preferably so chosen that it can always accommodate one test quantity or an integral multiple of a test quantity. In the case of the embodiment here described, for example, the length of the seed band 75 can be so chosen that either four hundred seeds or advantageously eight hundred seeds can be accommodated in one band length.

In order to ensure that the germination of the seeds is as undisturbed as possible, the spool 69 for the seed band according to the invention is made with the thinnest possible spokes, in that, as shown in FIGURE 4 of the drawings, cruciform guides 80 for the band, formed of thin rods are fixed to both ends of a receiving core 79, the outer ends of the guides preferably being held together by thin rings 81.

It can be seen from FIGURE 2 of the drawings that the seed band spool 69 is supported on a spindle 82 provided on an arm 83 projecting out from the setting table G. The seed band 75 unwinding from the spool 69 is introduced by a deflecting roller 84 and two guide rollers 85 into the depositing device 68, which will now be briefly described.

As already mentioned, the individual seeds are advantageously placed in a test magazine, which should comprise as many separate chambers as there are seeds in the germination batch to be tested. Thus, in the present embodiment, the magazines comprise preferably four hundred or eight hundred separate chambers, each of which receives a single seed.

Fixed to the setting table G are guideways, along which a carriage can be intermittently displaced, the carriage in its turn comprising transverse guides, along which a magazine is itself capable of being displaced intermittently. Fixed on the setting table G is a funnel-shaped depositing aperture 91 beneath which the seed band 75 is guided between guide means, not shown in the drawing, so that its recesses 76 are brought into coincidence with the bottom end of the depositing aperture 91 as the band advances. The advance of the magazine along the guides of the carriage can for example be effected by an endless belt, which is driven by an electric motor, and the step-by-step movements of which are controlled by an electromagnetically actuated detent, which co-operates with a detent bar arranged on the magazine. The longitudinal movement of the carriage along the guideways is also effected intermittently in similar manner by means of an endless belt, which is driven by an electric motor, and the step-by-step movements of which are controlled by an electromagnetically actuated detent, which co-operates with a dent bar fixed on the carriage.

A synchronizing device 74 indicated in FIGURE 2 of the drawings comprises a light barrier 100 beneath the depositing aperture 91, which responds to the recesses 76 or 78 of the seed band 75. Connected in front of the seed band 75 is preferably a short leader strip which consists of a smooth band, one end of which is fixed to the core of the seed spool 72, and which is of such a length that with the commencement of the automatic depositing of the seeds, the leader strip still extends somewhat beyond the light barrier 100, that is, towards the left of the barrier 100 in FIGURE 2. The light barrier 100 co-operates with the transverse feed of the magazine carriage in such a way that every time a recess 76 of the seed band 75 is situated beneath the lower end of the depositing aperture 91, the magazine is so advanced in a transverse direction that always the next magazine chamber of a row of chambers is located above the depositing aperture 91. In this way, with each advancing step of the magazine, always one seed 101 drops into the recess 76 of the seed band 75 which is actually at that instant beneath the aperture 91. This process is repeated until one row of the magazine is completely emptied. When the magazine has been displaced from left to right in this way, it abuts against a limit switch, by which the driving motor is switched over to the other direction of rotation. Simultaneously, the limit switch initiates the advance of the carriage by one step, so that the next row of magazine cells is now located above the upper end of the funnel-shaped depositing aperture 91. The emptying of this next following row of magazine cells is now completed by the step-by-step advance of the magazine from right to left. When the magazine has again reached the left side of the carriage 87 and the corresponding row of magazine chambers is completely emptied, the magazine strikes against another limit switch, by which once again the direction of rotation of the driving motor is reversed and simultaneously the driving mechanism of the magazine carriage is actuated to move the carriage once again forward by one step along its guides, so that now the third row of magazine chambers in the magazine is situated above the aperture 91.

Further details regarding the circuit of the synchronising apparatus 74 need not be explained in this connection, since such circuits are known to persons skilled in the art. It is merely necessary for this circuit to ensure a stepwise, zig-zag emptying of the magazine in the manner indicated above, so that the four hundred seeds 101 disposed, for example, in the four hundred chambers of a test magazine are in succession deposited separately in four hundred successive recesses 76 of a seed band 75. If the accommodation capacity of a seed band is only four hundred seeds, the setting operation is completed after emptying a single magazine. Seed bands having a larger capacity can of course accommodate the contents of several magazines, in which case it need only be ensured that the number of recesses 76 of the corresponding seed band 75 is an integral multiple of the actual number of chambers in the magazine being used. In such a case, a hand switch is preferably included at a suitable position in the circuit of the synchronising arrangement, the switch enabling the advance of the seed band 75 and the automatic progress of the setting operation to be stopped on the emptying of a magazine. The circuit is preferably reversible in such a way that with the completion of a setting operation, that is, with the emptying of a magazine, the setting operation which follows always takes place in reverse sequence, so that the carriage does not have to be returned beforehand to its initial position.

Instead of the light barrier 100, it is of course also possible to provide any other type of electrical sensing device, for example, a very light feeler tongue which operates on a relay.

In addition, it is possible to provide limit switches which, in each case after completion of a setting operation, automatically switch off the advance of the seed band and the step-by-step advance of the depositing device.

After leaving the depositing device 68, the seed band 75 with the seeds 101 placed in its recesses 76, in the course of its advance (towards the right as shown in FIGURE 2), passes beneath a device in which the moist band 104 unwinding from the moist band spool 70 is laid on the upper side of the seeds 101. The moist band 104 advantageously consists of cellulose or filter paper and preferably has the same width as the seed band. Its length is preferably longer than that of the seed band 75, and by the same amount as corresponds to the length of the leader strip of the seed band. Where appropriate, the moist band 104 can be impregnated with germination-promoting agents and/or with agents which inhibit damage to the seeds. The moist band 104 runs over deflecting rollers 105 and 106 and is pressed by means of a spring-loaded or weighted pressure roller 107 onto the upper side of the seeds 101, so that from this point, it advances together with the seed band 75 to the seed spool 72 and is wound together with the seed band on the spool.

Arranged after the pressure roller 107 in the direction of travel of the band is a moistening device, which is indicated generally at 73, and which consists essentially of a drip nozzle 108, the dripping rate of which can be adjusted manually by a regulating cock 109. The opening of the drip nozzle 108 is so arranged relative to the guideway for the seed band 75 and the moist band 104 that the moistening liquid discharging therefrom is distributed uniformly over the width of the moist band 104. An electromagnetically actuated valve indicated at 111 is advantageously fitted into the supply pipe 110 for the moistening liquid, the actuating magnet of the valve being connected into the circuit of the electric motor employed to advance the band, so that when the band movement is switched on, the supply of moistening liquid to the drip nozzle 108 is made available through the pipe 110, while on stopping of the travel of the band, the supply of moistening liquid through the pipe 110 is shut off.

Water normally serves as moistening liquid. However, the moistening liquid may have admixed therewith disinfectants or germination-promoting agents and/or agents inhibiting damage to the seeds.

After passing beyond the moistening device 73, the two bands 75 and 104 with the seeds 101 situated therebetween arrive at a position at which the cover band 112 unwinding from the cover band spool 71 is placed on the moist band 104. The cover band 112 advantageously consists of a smooth synthetic plastic, for example, polyethylene, and preferably has the same width as the seed band. The thickness thereof can be substantially less than that of the seed band, as it serves primarily as a simple tension band in the counting-out operation and in addition contributes to holding the seeds in the recesses of the seed band. Its length is substantially the same as that of the moist band 104. The cover band 71 runs over guide rollers 113 and 114 and is laid by the last-mentioned guide roller on the moist band 104 in order then to be wound together with the latter and the seed band 75, as well as the seeds 101 situated therebetween, onto the seed spool 72.

The seed band spool 69, the moist band spool 70 and the cover band spool 71 can be braked by weight-loaded or spring-loaded band brakes (which are not shown in the drawing) in order to ensure a uniform band tension in the coresponding bands. The bands of these band brakes can either rest on brake drums fixed to the cores of these spools or directly on the bands to be unwound.

The seed spool 72, which constitutes the empty take-up spool on commencing the setting operation, can be fitted in similar manner to the seed band spool 69 onto a spindle on a fixed arm secured on the setting table G. The height of the spindle is preferably so chosen that at the commencement of the winding operation, the bands running onto the seed spool 72 travel slightly upwards from the guide roller 114 and, towards the end of the winding operation, they travel downwardly by about the same amount, it being presupposed that the bands travel upwardly onto the spool 72 rotating in a counter-clockwise direction, as shown in FIGURE 2. According to the embodiment of the invention shown in FIGURE 2, however, the spindle 115, carrying the spool 72, is located at the free end of a projecting arm 116, which in its turn is pivotally mounted at 117 on the setting table G so that it can be rocked in a vertical plane. A driving collar, which is mounted on the spindle 115 and which can be brought into engagement with the core of the seed spool 72 when the latter is fitted, is connected through an endless belt or chain drive 118 to the driving shaft of an electric motor 119, which ensures an invariable band speed with a likewise invariable band tension of about 1.4 kg./cm.². Such self-regulating electric motors are known to the person skilled in the art, for example under the name "Alquistmotor." The diameter of the driving shaft 120 of the electric motor 119 is so chosen that with each revolution of the seed spool 72, the spindle is lifted by a band 121 being wound on the driving shaft 120 to an extent which corresponds to the increase in diameter of the seed band coil on the seed spool 72 during one revolution. The result which can hereby be achieved is that the bands 75, 104 and 112 running onto the seed spool 72 always occupy a horizontal position between the guide roller 114 and the seed band coil on the spool 72. In FIGURE 2 of the drawings, the seed spool, in the fully wound and lifted position, is indicated in chain-dotted lines at 72'.

As soon as one or more quantities of test seeds, for example four hundred seeds or a multiple thereof, have been reeled into the seed spool 72, the driving motor 119 is stopped by means of a cut-out not shown in the drawings. This can for example be effected by means of a light barrier, also not shown in the drawings, connected to a counter which counts the number of recesses 76 of the seed band 75 travelling past the light barrier or directly counts the number of seeds 101 positioned thereon. By this means, there is simultaneously made possible another control which assists in accurately maintaining the test quantities. As a modification thereof, the switching off of the driving motor 119 can also be effected by the end of the wound bands 75, 104 and 112, in which once again a light barrier may be used as an end feeler or limit switch. Clearly this does not exclude the possibility that the circuits of the setting table G, after the completion of the setting and winding operation, may be capable of being switched off manually following visual observation by an operator.

With an installation as described, a band speed which has proved to be satisfactory is from about 2 cm./sec. to 4 cm./sec. It is clearly possible that even lower or perhaps even higher band speeds can be used. On the basis of a test quantity of 400 seeds used during the example described herein and a capacity of the seed band 75 of eight hundred seeds, then with the depositing and band winding device as described above, it is necessary for the test magazine 44 to be changed about every seven minutes and for the fully wound seed spools 72 to be changed about every 15 minutes. The supervision of the setting and winding operation by an operator is reduced to a minimum, so that the operator also has time for other work.

In carrying out the next following processing step according to the invention, the fully wound seed spools 72 are transferred either by means of known conveyor devices or by hand into the germination chamber H. The germination chamber can be constructed in known manner as a thermostatically or hygrostatically regulated dark chamber. In the case where the seed spools 72 are introduced mechanically by means of conveyor devices into the germination chamber and again removed from the latter by mechanical conveyor means, admission and discharge doors may be provided which are controlled by the conveyor means and which seal off the germination chamber, as it were, from the atmosphere. In every case, it is advisable for the seed spools entering the germination chamber to be collected and stacked therein in groups. For this purpose, the germination chamber is advantageously equipped with holding means, which permit several seed spools to be stacked in groups one above the other with their axes vertical.

According to one preferred embodiment of the invention, the germination chamber H has the form of a pot, in which can be fitted interchangeable frames on which the separate seed spools 72 are held on vertical mandrels, as shown in FIGURE 1. It is preferable for three seed spools 72 always to be fitted one above the other on one holding mandrel of the frame. In the pot-shaped germination chamber, which is completely sealed off from the outside atmosphere and kept at constant temperature, it is possible for the climatic conditions necessary for germination to be adjusted in very favorable manner. Since there is only a very small amount of evaporation of water inside the germination chamber, remoistening of the seed spools 72 is not necessary. At the same time, by means of such an arrangement, the highest possible degree of uniformity as regards the moistening of the seeds is ensured, so that the germination takes place under conditions which are always the same and invariable. It is preferable for twelve seed spools 72 always to be arranged on a holding frame, so that the transport of the seed spools to the germination chamber H or from the germination chamber to the seed counting device K is effected economically.

A germination chamber temperature of about 25° C. is preferably maintained in known manner in the germination chamber. The germination period, that is the period during which the seed spools 72 remain in the germination chamber, can be about five to ten days, as is known.

The seed spools 72 are so disposed in the germination chamber that the recesses 76 of the seed bands 75 are always nearer the upper face of the spool. With the germination of the seeds, it is consequently possible for the roots within the band coil to develop downwards, whereas the seedlings grow upwards from the seed spools under similar conditions to those which exist in a seeded field, and consequently all emerge at the upper face of the seed spools.

The germinated seed spools 72 now travel from the germination chamber H, either by means of a conveyor device, which is of known form and therefore not further described, or by hand, to the seed counting table K, which is hereinafter described in detail with reference to FIGURES 6 and 7 of the drawings.

The germinated and upended seed spool 72 is supported on a spindle carried by a projecting arm 131 of the seed counting table K so that the seedlings projecting at one of its faces project beyond the edge of the band when the band is travelling across the table K. The seed band 75, the moist band 104 and the cover band 112 are drawn off the seed spool 72 together with the germinated seeds 101 disposed therebetween and are guided by guide rollers 132 on to the table top of the seed counting table K, on which the actual germination count is carried out. In order that this counting operation can be satisfactorily carried out optically, two leader strips are attached to the common end of the three bands 75, 104 and 112, one of the said strips travelling over guide rollers 133 and 134 on to an empty spool to be wound as a seed band spool 69′, while the other travels beneath the guide roller 133 over the top of the counting table K, at the end of which it is deflected by a guide roller 135 in order to run on to an empty spool to be found as a cover band spool 71′. The leader strip running on to the seed band spool 69′ is fixed to the free end of the seed band 75 and the leader strip running on to the cover band spool 71′ is fixed to the free end of the cover band 112. Consequently, as soon as the free end of the three bands 75, 104 and 112 has reached the deflecting roller 133, the seed band 75 is guided upwardly around said roller 133 and over the roller 134 to the seed band spool 69′, while the cover band 112, together with the moist band 104 disposed thereabove, and the germinated seeds 101 resting thereon, is conducted over the top of the germination counting table K in a straight path until it is deflected downwardly by the deflecting roller 135 at the end of the table. The cover band 112 then travels past a scraper 136, which separates from it the moist band 104 disposed thereon with the germinated seeds sticking thereto. The cover band 112 cleaned in this way is then wound on to the cover band spool 71′, while the separated moist band 104, which has in any case become unsuitable for further use because of the moistening and germination of the seeds 101, travels together with these seeds 101 into a waste bucket 137. In order to ensure satisfactory transport of the bands, the seed band spool 69′ is driven by an electric motor 138 through a transmission 139 and a slipping clutch 140 acting on the spool driving means, while the same electric motor 139 directly drives the spool driving means for the cover band spool 71′ through a transmission 141. In order that the bands 75, 104 and 112 unwinding from the seed spool 72 are under constant tension, the seed spool 72 can be braked by a weight-loaded band brake which is not shown in the drawing and the brake band of which acts either on a brake drum or directly on the band coil unwinding from the seed spool 72.

A light barrier indicated at 142 is arranged between the rollers 133 and 134 and responds to the recesses 76 or 78 of the seed band 75. The counter pulses of the photoelectric cell of the light barrier 142 are counted, for example, by a counter 143, which thus indicates the number of seeds 101 tested. The seedlings projecting over the edge of the moist band 104 and the cover band 112 towards the top of the counting table K travel beneath a light barrier which is indicated at 144, the photoelectric cell of which passes its counting pulses to a counter 145, for example, which thus indicates the total number of the counted seedlings. In order to be able to include seedlings which by accident do not project beyond the edge of the band, and in order to be able suitably to correct the counting result in the case of seedlings which are too close together and, where desired, to be able to include multiple germinations separately, pulse keys 147 to be actuated manually are arranged on a keyboard 146, the keys making it possible for correcting pulses to be sent to the counter system formed by the counters 143 and 145 and when necessary an additional counter 148. A part of the top of the counting table K thus forms an observation zone, which makes it possible for the operator to detect visually multiple germinations or too closely juxtaposed seedlings of adjacent seeds 101 and to correct the result of the counting system 143, 145, 148 to correspond to the correct value.

The seed or germination count by the process according to the invention thus permits a satisfactory and completely error-free detection of both the total number of the seeds being tested and the total number of single germinations, the total number of non-germinations and the total number of multiple germinations on separate counters.

According to a preferred embodiment of the invention, the counters 143, 145 and 148 of the counting system are equipped with printing mechanisms by which test certificates are immediately printed. By this means, even final sources of error in the transfer of the test results to the test certificates are excluded. The counting table K can be equipped with an automatic cut-out, which is actuated for example by a resetting counter 149 and which switches off the counting arrangement as soon as the number of a complete test quantity is reached, that is to say, in the example chosen, the number of four hundred germination tests.

Both as regards the setting table G and the seed counting table K, the individual devices can be duplicated on both sides of the table, whereby the economy of these arrangements can be still further improved.

The process described above mainly in connection with the testing of sugar beet seeds, and also the associated apparatus according to the invention, can of course also be used for any kind of seed testing, with the exception of fine seeds. It need hardly be pointed out that because of the almost complete automation of the test method, it is possible on the one hand to save personnel and on the other hand to arrange without difficulty the work to be carried out during a test campaign which generally lasts seven months, so that there is still sufficient time for tests which may have to be repeated or for multiple tests to be carried out.

The process described about and the associated equipment can also be used for light germination tests with beets. For this purpose, it is for example possible with each test additionally to count out one hundred seeds by means of the automatic counting device and to lay these by means of the depositing device separately in seed magazines. For such light germination tests, transparent seed bands are used, which can also be made of polyethylene. The seed spools are in this case placed under glass after commencement of germination, so that the seeds continue to grow under diffused daylight. In the case of coloured turnips, the seedlings assume a colouring, whereby they can be distinguished from sugar beets. The depositing of the seeds can also in this case be effected in the usual manner on the setting table, while the counting out can likewise be effected in the usual manner on the seed counting table. It is thus possible to employ usefully all advantages of the invention for such test methods.

One important application of the process according to the invention lies in the cultivation of plants by hydroculture, peat culture or soil culture, in which case seed spools filled according to the invention are laid with the root side of the seedlings on the relevant cultivation support. This provides the advantage that a very large number of plants can be contained on an extremely small surface and that the heavy labor cost for pricking out the plants and also for the supervision thereof can be reduced to a considerable extent.

By comparison with the known state of the art, the following advantages as regards industrial economy and quality result from carrying out germination tests of sugar beet seeds by means of the invention:

(1) The possibility of enhanced certainty of the results by increasing the number of concurrent tests, thereby eliminating the previously used count percentage method, whereby a considerable saving in labor is obtained. There is also a positive and appreciable acceleration in carrying out the tests, thus avoiding relatively large testing arrears.

(2) The use of a uniform, standardized germination medium.

(3) The elimination of labor costs for the transport and sterilization of germination sand.

(4) The accurate proportioning and simultaneous distribution of the water supply for the germination process.

(5) A saving of space in the germination chamber and consequently a substantial increase in germination capacity.

(6) An extraordinary high reliability of the counting results due to the simple and easy visual detection of the exposed individual germinated seeds and additionally due to counting by means of automatically operating counter devices.

(7) The exclusion of errors due to fatigue of operators in couting operations extending over a long period.

(8) A considerable saving in personnel and thus also of working space.

(9) The possibility of easier supervision of the testing operation because the test arrangements can be better supervised.

(10) Pleasanter work for the few operators still required.

(11) When using printing devices on the counter mechanisms, elimination of errors in reporting the test results.

(12) The possibliity of carrying out light germination tests likewise with a substantially reduced labor force.

(13) A quick recovery of the costs of installing the test apparatus according to the invention, because of the very substantial saving in personnel and considerable acceleration of the test work as such.

(14) The possibility of using some of the steps of the process according to the invention in the cultivation of plants, more especially using the depositing device and the seed spools according to the invention.

(15) The possibility of using the process according to the invention for the testing and treatment of other types of seeds, with the exception of fine seeds.

I claim:

1. An apparatus for testing the germination of seeds, said apparatus comprising, in combination, a table, a rotatably mounted reel having a recessed and corrugated synthetic plastic band thereon, means for feeding said band from said reel over said table, means for depositing a predetermined number of individual seeds into said recesses of said synthetic plastic band, a rotatably mounted reel having a moisture storing band thereon, said moisture storing band consisting of filter paper and being of substantially the same width as said first mentioned band, means for simultaneously feeding and applying said moisture storing band over said seeds, means disposed above said table and adapted to moisten said moisture storing band after having been applied over said seeds, a spool, means for winding said band with said seeds therebetween said spool, a germination chamber disposed adjacent said table having vertically arranged spool holding means therein, means for transferring said spool to said chamber, a counting table disposed adjacent said germination chamber, means for transferring said spool from said chamber to said counting table, said counting table having means rotatably holding said spool, means for pulling said bands from said spool over the surface of said counting table, means for counting seedlings originating from said seeds, means for separating said recessed synthetic plastic band from said moisture storing band and from said seedlings and means for winding said recessed and corrugated synthetic plastic band on another spool.

2. An apparatus as defined in claim 1, in which means are provided for simultaneously feeding and applying over said moisture storing band a cover band consisting of synthetic plastic.

3. An apparatus as defined in claim 1, in which conveyor means are provided for transferring said spool to said germination chamber and in which second conveyor means are provided for transferring said spool from said germination chamber to said counting table.

4. An apparatus as defined in claim 1, in which photo-electric means are arranged on said counting table for counting the seedlings on said moisture storing band and a visual observation zone being provided on said counting table for permitting the inspection of seedlings, and manually actuated means connected to said counting means to record multiple germination determined by visual inspection.

5. An apparatus as defined in claim 1, in which said automatic counting means includes photo-electric means with two light beams, one light beam serving to count the number of seeds and the other one serving to count the seedlings, a separate indicator being provided for indicating the counted number of seeds and a common indicator being provided for indicating the counted number of seeds and seedlings.

6. An apparatus as defined in claim 1, in which printing means are provided, said automatic counting means serving to control operation of said printing means to provide a printed record, a common drive source for said band feeding means, said feed depositing means, said band winding means and said band pulling means, and a switch controlled by said automatic counting means for stopping the operation of said common drive source after counting a predetermined number.

7. An apparatus for testing the germination of seeds, said apparatus comprising, in combination, a table, a reel rotatably mounted on said table and having a recessed synthetic plastic band thereon, guide rollers for guiding said band moving from said reel over said table, a brake for said reel to provide a predetermined tension in said synthetic plastic band, automatic means on said table for depositing a predetermined number of individual seeds in a row of recesses in said synthetic plastic band, guide rollers on said table for guiding said seed carrying synthetic plastic band, a reel rotatably arranged on said table and having a moisture storing band thereon, guide rollers on said table for guiding said moisture storing band moving from said last named reel over the seeds on said synthetic plastic band, a brake for said last named reel to provide a predetermined tension in said moisture storing band, a moisture supply nozzle disposed above said moisture storing band and above said synthetic plastic band, a reel having a cover band thereon, guide rollers on said table for guiding said cover band moving from said last named reel over said moisture storing band, a brake for said last named reel arranged to provide a predetermined tension in said cover band, an empty spool rotatably mounted on said table for receiving the super-imposed synthetic plastic band, said moisture storing band and said cover band, an electrical drive means arranged on said table for said spool for winding said super-imposed bands thereon at a constant speed, an electro-magnetic valve for controlling the flow of liquid to said nozzle, said valve being connected in the circuit of said electrical drive means, whereby liquid flows to said nozzle only during operation of said electrical drive means, and automatic switch means for stopping said electrical drive means after deposition of a predetermined number of seeds on said synthetic plastic band.

References Cited by the Examiner

UNITED STATES PATENTS

| 1,279,310 | 9/18 | Esslinger | 47—15 |
| 2,323,746 | 7/43 | Woolf | 47—56 |
| 2,876,588 | 3/59 | Tietz | 47—56 X |

FOREIGN PATENTS

| 107,935 | 8/39 | Australia. |
| 552,448 | 12/46 | Italy. |

OTHER REFERENCES

Farmers' Bulletin 948, "The Rag-Doll Seed Tester," published in 1918, 7 pages.

ABRAHAM G. STONE, *Primary Examiner.*

T. GRAHAM CRAVER, *Examiner.*